Sept. 27, 1966         E. P. KENNEDY         3,275,094
                MOTOR VEHICLE PEDAL SUPPORT
                    Filed July 22, 1964
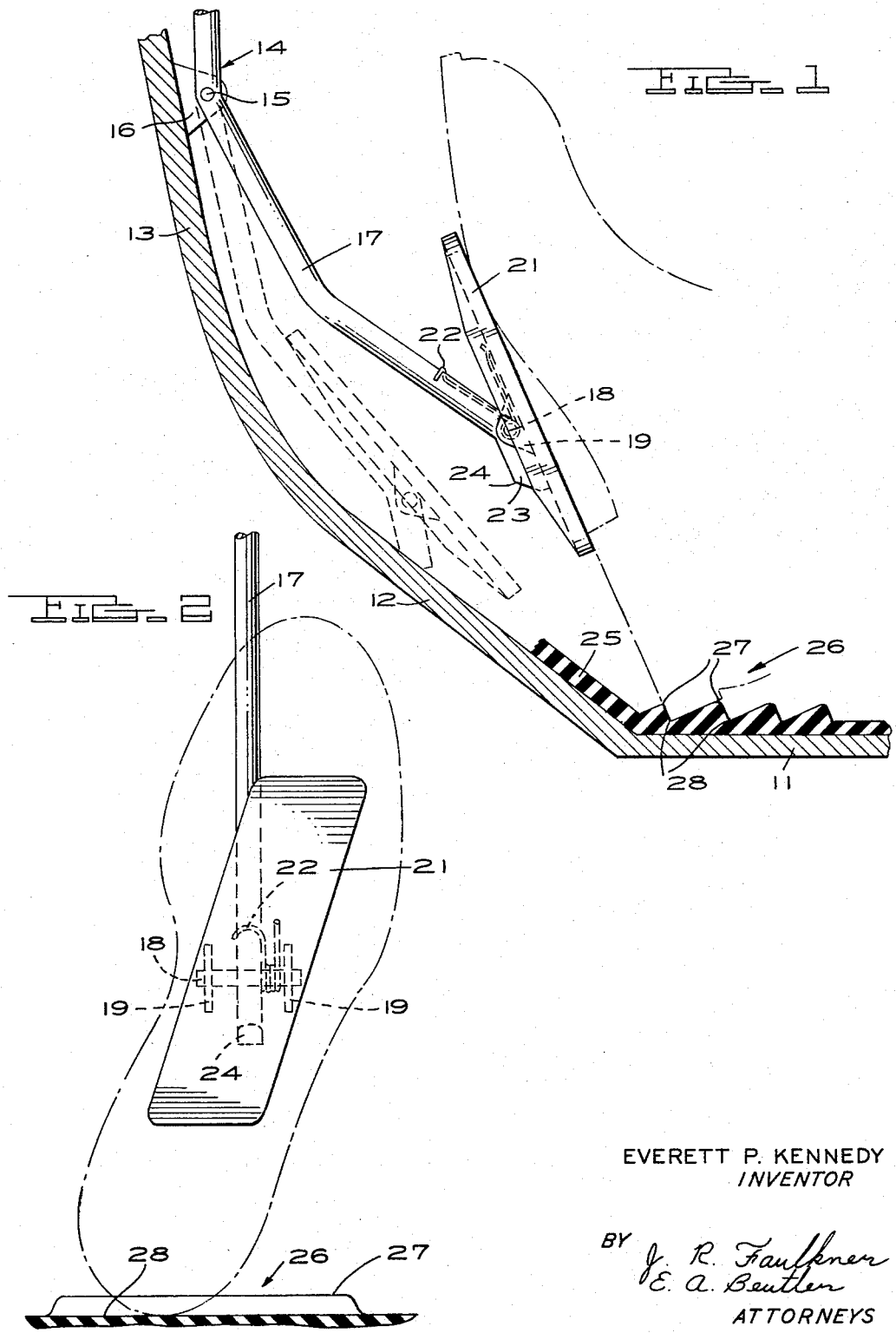
EVERETT P. KENNEDY
    INVENTOR
BY  J. R. Faulkner
    E. A. Beutler
            ATTORNEYS

3,275,094
MOTOR VEHICLE PEDAL SUPPORT
Everett P. Kennedy, Detroit, Mich., assignor to Ford Motor Company, Dearborn, Mich., a corporation of Delaware
Filed July 22, 1964, Ser. No. 384,383
4 Claims. (Cl. 180—90.6)

This invention relates to a support for an actuating pedal and more particularly to an accelerator pedal support for a motor vehicle.

Several of the controls of motor vehicles, for example, the clutch, brake and the throttle linkage, are controlled by pedals. For many years all of the pedals operated controls comprised levers that were pivotally supported at or below the floor pan of the motor vehicle. A pedal was rigidly attached to the upper end of the lever for actuatoin by the vehicle operator. More recently the clutch and brake levers have been supported about a pivotal axis that is spaced a substantial vertical distance above the floor pan. These types of pedal supports are commonly termed "suspended pedals."

There are several advantages to the use of a suspended pedal. By pivotally supporting the pedal at a point that is above the floor pan it is not necessary to form holes in the carpeting or other floor covering to accommodate the linkage. Pedals that are pivotally supported on the floor board or below also require a higher pedal effort on the part of the female operator since she will have a shorter foot and accordingly a smaller lever for actuating the pedal. Because of these advantages it is now conventional to utilize suspended clutch and brake pedals at points about the floor pan.

Although a suspended accelerator pedal would offer the same advantages as the suspended clutch and brake pedal, this type of pedal has not found any wide acceptance. The prime reason why a suspended accelerator pedal has not been used is because of the scuffing action which results between the sole of the operator's foot and the face of the suspended pedal. An elongated accelerator pedal that is suspended from a point about the floor pan travels through a different arc than the sole of the operator's foot that has a pivot axis located upon the floor pan. This problem is not noticeable with clutch and brake pedals since they are shorter, and the operator's foot is lifted from the floor when they are actuated. The clutch and brake are also not operated as frequently as the accelerator. Due to the numerous accelerator pedal movements, this scuffing action can become very objectionable to the vehicle operator.

It is therefore a principal object of this invention to provide a suspended pedal for a motor vehicle that reduces the amount of scuffing action between the operator's foot and the face of the pedal.

It is a further object of this invention to provide a pedal arrangement for a motor vehicle that permits adjustment in the position of the operator's foot to reduce fatigue during long trips.

A motor vehicle embodying this invention comprises a passenger compartment defined in part by a horizontally extending floor pan and an adjacent, vertically extending dash panel. A lever is supported for pivotal movement about a pivot axis spaced a substantial vertical distance above the floor pan. The lever has a portion that extends downwardly from the pivot axis toward the floor pan and inwardly of the passenger compartment from the dash panel. An elongated pedal is supported for relative movement upon the end of the lever portion to permit conformance to the most comfortable foot position of the vehicle operator. Motion transmitting means interconnects the lever with a pedal operated component of the vehicle.

As a further feature of the invention, a pad is provided that extends across at least a portion of the floor pan. A heel rest is formed by the pad adjacent to and below the pedal. The heel rest comprises a plurality of serrations having raised portions terminating adjacent depressed bights. The bights are longitudinally spaced at varying distances from the dash panel to establish variable fulcrum positions for the heel of the vehicle operator.

Further objects and advantages of this invention will become more apparent when considered in conjunction with the accompanying drawings, wherein:

FIGURE 1 is a vertical cross-sectional view of a portion of a motor vehicle embodying this invention.

FIGURE 2 is an elevational view of the construction shown in FIGURE 1.

Referring now in detail to the drawings, there is depicted a motor vehicle passenger compartment defined in part by a horizontal extending sheet metal floor pan 11. At one end the floor pan 11 terminates in an angularly disposed, integral toe board 12 that, in turn, extends into a substantially vertical dash panel 13. An accelerator lever indicated generally by the reference numeral 14, is pivotally supported by a pivot pin 15 that is journaled in a bracket 16 affixed to the dash panel 13. The pivot pin 15 is disposed a substantial vertical distance above the floor pan 11. The accelerator lever 14 is connected at its upper end to the throttle linkage of a motor vehicle engine in any suitable manner (not shown).

From the pivot pin 15, the accelerator lever 14 has a dog-leg shaped portion 17 that extends downwardly and inwardly of the passenger compartment from the dash panel 13. The lower end of the accelerator lever portion 17 terminates above the toe board 12. A pivot pin 18 is affixed to the lower end of the accelerator lever portion 17. The pivot pin 18 extends through apertures in brackets 19 that are affixed to an elongated accelerator pedal 21. The brackets 19 are positioned between upper and lower ends of the accelerator pedal 21 and pivotally support the pedal 21 upon the pivot pin 18 and accelerator lever 14.

A torsional leaf spring 22 is interposed between the accelerator lever portion 17 and the accelerator pedal 21. One end of the torsional spring 22 engages the lever portion 17 and the other end engages the accelerator pedal 21 to normally urge the pedal 21 in a clockwise direction about the pivot pin 18 as viewed in FIGURE 1. The amount of clockwise rotation is limited by the contact of the accelerator pedal 21 with a downturned end 23 of the lever portion 17 (solid line view of FIGURE 1).

The spring 22 may yield under the influence of forces exerted upon the accelerator pedal 21 above the pivot pin 18. This permits the pedal 21 to rotate relative to the accelerator lever 14 to assume the most comfortable position for the foot of a male operator of the vehicle. Men having long feet will generally contact the accelerator pedal 21 at some point above the pivot pin 18. Persons with smaller feet, such as women, will normally contact the accelerator pedal 21 below or close to the pivot pin 18. This gives the person with the shorter foot a longer effective lever arm about the pivot pin 15.

As the accelerator pedal 21 is depressed, the accelerator lever 14 pivots in a clockwise direction about the pivot pin 15. During this movement the accelerator pedal 21 may also pivot in a counterclockwise direction relative to the accelerator lever 14 through the yielding of the spring 22 so that the path of movement of the sole of the operator's foot may conform closely to the path of movement of the point of contact of the operator's foot with the accelerator pedal 21. The pedal 21 and accelerator lever 14 may move from the normal idle position shown on the solid line view to a fully depressed, wide-open throttle position. The wide-open throttle position is determined by the contact of a bevelled edge 24 of the accelerator lever end 23 with the toe board 12 as shown in the dotted line view of FIGURE 1.

Means are additionally provided to permit the vehicle operator to select varying foot positions to reduce fatigue during long trips and to accommodate individual preferences for foot positioning. The means comprises a floor pad 25 that extends across the floor pan 11 and at least a portion of the toe board 12. A foot rest portion, indicated generally by the reference numeral 26 is formed integrally with the pad 25. The foot rest portion 26 comprises a plurality of serrations made up of raised portions 27 that terminate adjacent depressed bights 28. By placing his heel in one of the bights 28, the operator may select a variable fulcrum position for his foot. The bights 28 are spaced at varying longitudinal distances from the dash pan 13.

It should be readily apparent that the shorter the operator's foot the greater the lever arm acting upon the accelerator lever 14. Because of its pivotal support upon the accelerator lever 14, the accelerator pedal 21 may assume the most comfortable foot position and may move during depression of the accelerator pedal to limit the degree of relative movement between the sole of the operator's foot and the face of the accelerator pedal. The pad illustrated also is constructed to permit adjustment for variation in the location of the operator's foot to reduce drive fatigue.

It is to be understood that the construction shown as described as exemplary only of a preferred form the invention may take. Various changes and modifications may be made without departing from the spirit and scope of the invention, as defined by the appended claims.

What is claimed is:

1. A motor vehicle comprising a passenger compartment defined in part by a horizontally extending floor pan and an adjacent vertically extending dash panel, a lever supported for pivotal movement about a pivot axis spaced a substantial vertical distance above said floor pan, said lever being rotatable from a normal position to a depressed position, said lever having a portion thereof extending downwardly from said pivot axis toward said floor pan and inwardly of said passenger compartment from said dash panel, an elongated pedal, means supporting said pedal upon said lever portion intermediate the upper and lower ends of said pedal for pivotal movement of said pedal relative to said lever portion to conform to the most comfortable foot position of the vehicle operator, biasing means interposed between said lever portion and said pedal for urging said pedal in the same pivotal direction as the movement of said lever from its normal to its depressed position, stop means for limiting the pivotal movement in said direction of said pedal relative to said lever portion under the influence of said biasing means, said biasing means being yieldable under the influence of forces exerted upon said pedal by the foot of the vehicle operator, motion transmitting means interconnecting said lever with a pedal-operated component of said vehicle, a pad extending across at least a portion of said floor pan, and a heel rest formed by said pad adjacent to and below said pedal, said heel rest comprising a plurality of serrations having raised portions terminating adjacent depressed bights, said bights being longitudinally spaced at varying distances from said dash panel to establish alternate fulcrum positions for the heel of the vehicle operator.

2. A motor vehicle comprising a passenger compartment defined in part by a horizontally extending floor pan, an angular toe board joined at one end to said floor pan and a vertically extending dash panel, a lever supported for pivotal movement about a pivot axis spaced a substantial vertical distance above said floor pan, said lever being rotatable from a normal position to a depressed position, said lever having a portion thereof extending downwardly from said pivot axis toward said floor pan and inwardly of said passenger compartment from said dash panel, stop means on said lever portion adapted to contact said toe board for limiting the depressed position of said lever, an elongated pedal, means pivotally supporting said pedal upon said lever portion intermediate the upper and lower ends of said pedal for pivotal movement of said pedal relative to said lever portion to conform to the most comfortable foot position of the vehicle operator, biasing means interposed between said lever portion and said pedal for urging said pedal in the same pivotal direction as the movement of said lever from its normal to its depressed position, stop means for limiting the pivotal movement in said direction of said pedal relative to said lever portion under the influence of said biasing means, said biasing means being yieldable under the influence of forces exerted upon said pedal by the foot of the vehicle operator, motion transmitting means interconnecting said lever with a pedal-operated component of said vehicle, a pad extending across at least a portion of said floor pan, and a heel rest formed by said pad adjacent said pedal, said heel rest comprising a plurality of serrations having raised portions terminating adjacent depressed bights, said bights being longitudinally spaced at varying distances from said dash panel to establish alternate fulcrum positions for the heel of the vehicle operator.

3. A motor vehicle comprising a passenger compartment defined in part by a horizontally extending floor pan and an adjacent vertically extending dash panel, a lever supported for pivotal movement about a pivot axis spaced a substantial vertical distance above said floor pan, said lever being rotatable from a normal position to a depressed position, said lever having a portion thereof extending downwardly from said pivot axis toward said floor pan and inwardly of said passenger compartment from said dash panel, an elongated pedal, means supporting said pedal upon said lever portion intermediate the upper and lower ends of said pedal for pivotal movement of said pedal relative to said lever portion to conform to the most comfortable foot position of the vehicle operator, biasing means interposed between said lever portion and said pedal for urging said pedal in the same pivotal direction as the movement of said lever from its normal to its depressed position, stop means for limiting the pivotal movement in said direction of said pedal relative to said lever portion under the influence of said biasing means, said biasing means being yieldable under the influence of forces exerted upon said pedal by the foot of the vehicle operator, motion transmitting means interconnecting said lever with a pedal-operated component of said vehicle.

4. A motor vehicle comprising a passenger compartment defined in part by a horizontally extending floor pan, an angular toe board joined at one end to said floor pan and a vertically extending dash panel, a lever supported for pivotal movement about a pivot axis spaced a substantial vertical distance above said floor pan, said lever being rotatable from a normal position to a depressed position, said lever having a portion thereof extending downwardly from said pivot axis toward said floor pan and inwardly of said passenger compartment from said dash panel, stop means on said lever portion adapted to contact said toe board for limiting the depressed position of said lever, an elongated pedal, means pivotally supporting said pedal upon said lever portion intermediate the upper and lower ends of said pedal for pivotal movement of said pedal relative to said lever portion to conform to the most comfortable foot position of the vehicle operator, biasing means interposed between said lever portion and said pedal for urging said pedal in the same pivotal direction as the movement of said lever from its normal to its depressed position, stop means for limiting the pivotal movement in said direction of said pedal relative to said lever portion under the influence of said biasing means, said biasing means being yieldable under the influence of forces exerted upon said pedal by the foot of the vehicle operator, motion transmitting means interconnecting said lever with a pedal-operated component of said vehicle.

References Cited by the Examiner

UNITED STATES PATENTS

| 1,487,197 | 3/1924 | Booth | 74—562 |
| 1,981,148 | 11/1934 | Muench | 74—564 |
| 1,987,806 | 1/1935 | Stark | 74—564 |
| 2,068,962 | 1/1937 | Sanford | 74—512 |
| 2,628,507 | 2/1953 | Juergens | 74—564 X |
| 3,025,713 | 3/1962 | Koshaba | 74—542 X |
| 3,075,602 | 1/1963 | Lanzone. | |
| 3,097,542 | 7/1963 | Chayne | 74—560 |

KENNETH H. BETTS, *Primary Examiner.*